Figure 1:
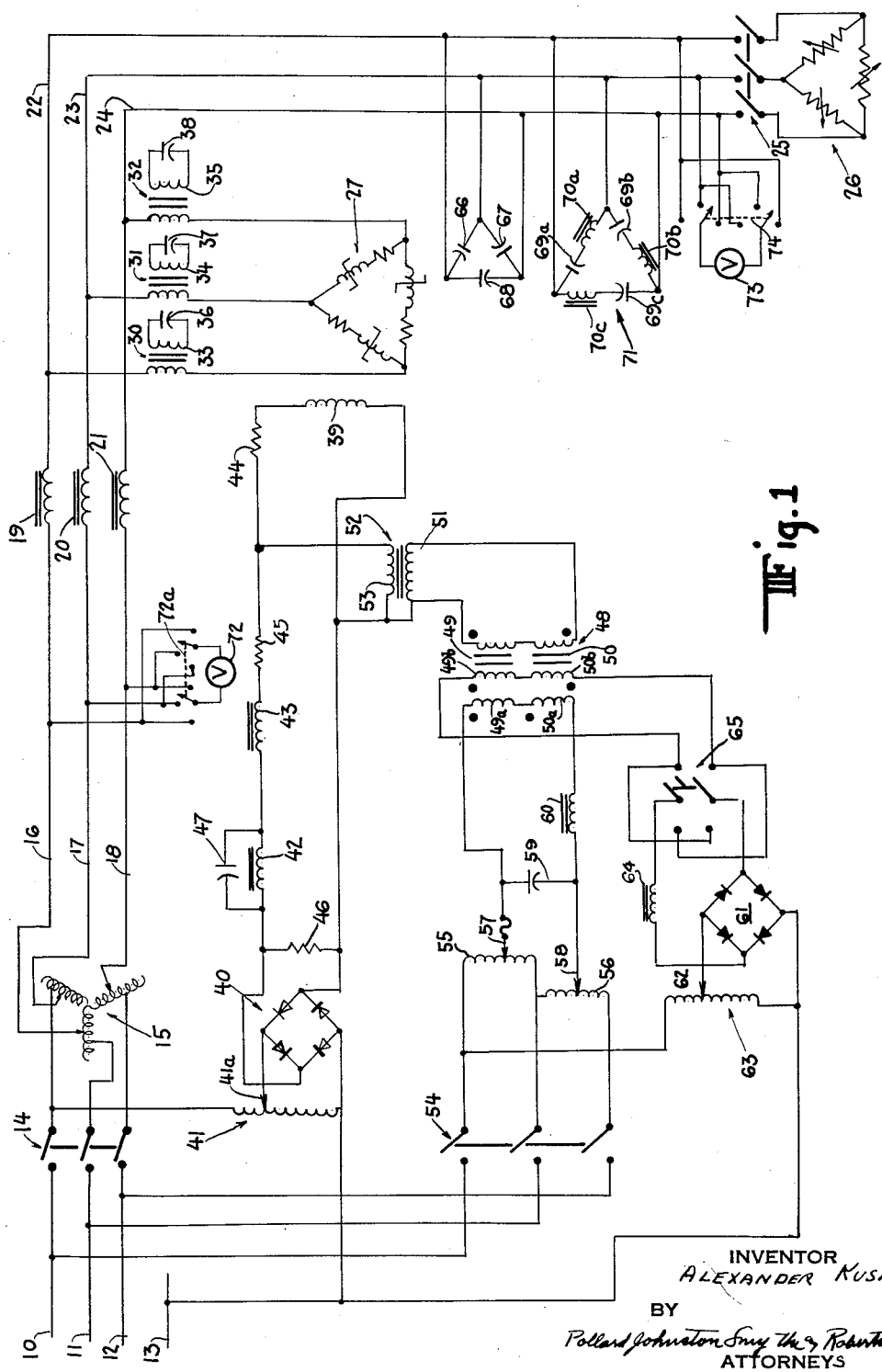

Feb. 20, 1962   A. KUSKO   3,022,426
REGULATOR
Filed May 21, 1959   2 Sheets-Sheet 1

INVENTOR
ALEXANDER KUSKO
BY
Pollard Johnston Suy the Robertson
ATTORNEYS

United States Patent Office 3,022,426
Patented Feb. 20, 1962

3,022,426
REGULATOR
Alexander Kusko, Newton Centre, Mass., assignor to Hevi-Duty Electric Company, Milwaukee, Wis., a corporation of Wisconsin
Filed May 21, 1959, Ser. No. 834,368
12 Claims. (Cl. 307—14)

This invention relates to a voltage regulator and particularly to one using a poly-unit saturable reactor.

One of the problems in a voltage regulator for a polyphase system using poly-unit reactors is that the poly-unit reactors may be sensitive to unbalanced polyphase conditions in the regulator circuit, the supply voltage, and the load. With an unbalance condition, the load currents of the poly-unit reactor may become unbalanced and distorted. In many applications such as voltage regulators, it is necessary to maintain balanced conditions across the polyphase load.

One of the objects of the invention is to provide an arrangement wherein the voltage across each phase of the load may be maintained balanced regardless of conditions tending to unbalance it.

Another object of the invention is to provide an arrangement wherein the load voltage can be maintained substantially constant regardless of conditions tending to change it.

In one aspect of the invention, an electrical load means can be connected to a source of A.C. through an impedance in series therewith. A poly-unit saturable reactor, such as described in copending application Ser. No. 536,156, filed September 23, 1955, can be connected in shunt across the load. Such a poly-unit reactor has a plurality of magnetic cores, preferably at least three, load windings and associated control windings. Normally, D.C. control power applied to the control windings is varied with variations in the load voltage for all phases from a reference value so as to maintain the load voltage substantially constant. The control windings in such an instance have the A.C. control applied thereto. A.C. control power having double the frequency of the source of A.C. is also applied to control windings of the poly-unit reactor. It also is possible to operate the poly-unit polyphase reactor without applying control power thereto. The magnitude and phase angle of the A.C. control power is varied with variations in load voltage of one phase with respect to the other phases to maintain the load voltage phases substantially balanced. By adjusting the phase and magnitude of the A.C. control, the phase and magnitude of the negative sequence component of circuit in the A.C. load windings of the reactor will be varied.

In a preferred form, a capacitor may be connected in shunt with the load to provide power factor correction. An L-C filter may also be connected in shunt with the load to absorb harmonic components present in the load circuit. The double frequency A.C. control power may be derived from the A.C. source.

These and other objects, advantages and features will become apparent from the following description and drawings which are merely exemplary.

Figure 2:
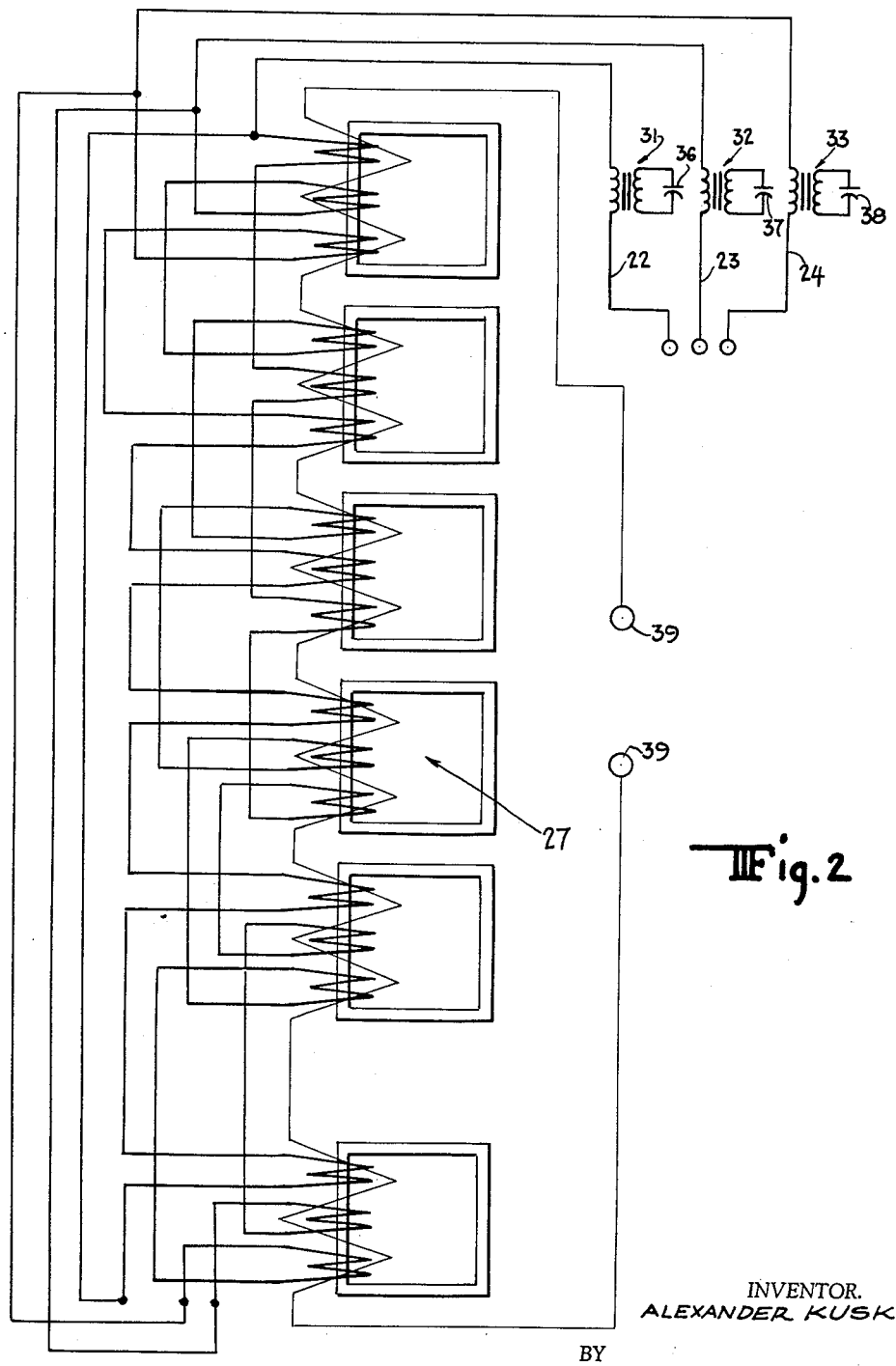

In the drawings:
FIG. 1 is one form of the circuit.
FIG. 2 is one form of the poly-unit reactor.

Three phase power is supplied to the system by means of lines 10, 11, and 12. Line 13 serves as the neutral connection for the polyphase supply. The three phase supply is connected through switch 14 to autotransformer 15 connected in Y across the polyphase system. Lines 16, 17 and 18 are connected to the adjustable taps of autotransformer 15 and lead to series reactors 19, 20, and 21. Lines 22, 23 and 24 connect reactors 19, 20 and 21 through switch 25 to three phase load 26 which may be connected in delta.

Poly-unit reactor 27 is connected across the three phase system to lines 22, 23, and 24 so as to be in parallel with load 26. The poly-unit saturable reactor may be of the type as described in copending application Ser. No. 536,156, filed September 23, 1955. Such a poly-unit reactor has a plurality of magnetic cores, preferably at least three, load windings, and associated control windings. As shown in FIG. 2, the poly-unit reactor may have $n$ number of phases and include at least three saturable magnetic cores and $n$ phase groups of load winding means. The load winding means in a phase group are connected in series. The unit is provided with $2n$ reactor load current terminals, the terminals being located at the ends of each group. An alternating current source is connected to the load winding terminals while a direct current source is connected in series with the control windings. Each of the reactors have their turns and core area related to the turns and core area of the others so that once during each cycle of the alternating current, the cores of at least some of the reactors pass from a saturated condition in one direction of magnetization to a saturated condition in the opposite direction of magnetization. During the same cycle of alternating current, the cores return to a saturated condition in the first direction. The cores make the transition from a saturated condition in one direction to a saturated condition in the opposite direction in a predetermined sequence. During intervals of time of predetermined length at least one core is in the state of transition from one saturated condition to the other, while at least some cores are in a saturated condition.

Poly-unit reactor 27 is connected in series with transformers 30, 31 and 32 for each of the three phases connected to lines 22, 23 and 24. The secondary windings 33, 34 and 35 of transformers 30, 31 and 32, respectively, may be connected to capacitors 36, 37 and 38 to introduce capacitive reactance to improve transient behavior.

D.C. power for control winding 39 of poly-unit reactor 27 is provided by full wave rectifier 40 connected across autotransformer 41 connected from the phase of line 10 to neutral line 13. Full wave rectifier 40 is connected through chokes 42 and 43, and resistors 44 and 45 to control winding 39. Resistor 46 is connected in parallel with the D.C. output of rectifier 40. Capacitor 47, connected in parallel with choke 42, is of predetermined value to form a filter for the D.C. output of rectifier 40.

Saturable reactor 48 serves as a frequency doubler of the supply frequency connected to lines 10, 11 and 12. Saturable reactor 48 may be of the two core type having cores 49 and 50 with primary windings 49a and 50a on cores 49 and 50, respectively, and connected in an aiding manner. Control or bias windings 49b and 50b are connected in an opposing manner. Secondary windings 49c and 50c are in opposition and are connected across primary winding 51 of transformer 52. Secondary winding 53 of transformer 52 is connected in parallel with the filtered output of rectifier 40. Transformer 52 may have a core containing air gap in order to prevent saturation by the D.C. current from rectifier 40.

By means of switch 54, autotransformer 55 is connected to lines 10 and 11 and autotransformer 56 is connected to lines 11 and 12. A phase shifted voltage may be obtained across transformer taps 57 and 58 of autotransformer 55 and 56. The phase shifted voltage across taps 57 and 58 is filtered by capacitor 59 and choke 60. It is then connected to primary windings 49a and 50a of saturable reactor 50.

The power supply to bias windings 49b and 50b of saturable reactor 50 is furnished by full wave rectifier 61 connected to tap 62 of autotransformer 63 connected between line 10 and neutral line 13. The D.C. output of rectifier 61 may be filtered by choke 64. Reversing switch 65 controls the sense of current flow through control windings 49b and 50b. Due to the differential magnetization of cores 49 and 50, second harmonic voltages are induced in gate windings 49c and 50c which are connected in an opposing manner. Thus, saturable reactor 50 serves to double the frequency of the phase shifted voltage derived across autotransformers 55 and 56.

The double frequency signal induced in secondary winding 53 of transformer 52 is combined by superposition with the D.C. current supplied by rectifier 40. The combined D.C. and double frequency A.C. signals are applied to control winding 39 of poly-unit reactor 27. The magnitude of the D.C. current from rectifier 40 is determined by the predetermined setting of tap 41a of autotransformer 41. The magnitude of its double frequency A.C. signal is determined by the level of the bias current through bias windings 49b and 50b. The current level through the bias windings is selected by the adjustment of tap 62 of autotransformer 63. The phase relationship of the double frequency control signal with respect to the phases of the power supply at lines 10, 11 and 12 is determined by the adjustment of taps 57 and 58 of autotransformer 55 and 56. The filter formed by choke 42, capacitor 47 and choke 43 prevents the double frequency from flowing in rectifier 40.

Capacitors 66, 67 and 68 may be connected in shunt across load 26 to improve the power factor. Series L-C circuits including capacitors and reactors 69a, b, c and 70a, b, c, respectively, may be connected across lines 22, 23 and 24 to form harmonic filter 71.

In the use of poly-unit saturable reactors 27 as a voltage regulator for poly phase load 26, the reactor is sensitive to unbalances in the three-phase voltage supplied to its terminals. This sensitivity may impair the usefulness of the reactor voltage regulator in power-system application. When the poly-unit reactor is supplied with unbalanced three phase terminal voltage on lines 22, 23 and 24, the load currents of the reactor become unbalanced and distorted. The distortion is due largely to a third harmonic component. An appreciable second harmonic component is induced in the control windings. Under these conditions, the individual reactor units continue to desaturate in the same order as they did when the terminal voltage was balanced, but the time interval during which succeeding units remain unsaturated are no longer equal. Unbalance conditions may also exist in load 26.

Unbalance supply voltage on lines 16, 17 and 18 may be indicated by means of voltmeter 72 and selector switch 72a. Unbalance load voltage across line 22, 23 and 24 may be indicated by means of voltmeter 73 and selector switch 74. Ordinarily, a balanced output voltage across load 26 is required. This balanced condition exists so long as the poly-unit reactor circuit, the input voltage and the load are all balanced. Under the balanced condition series reactors 19, 20 and 21 each draw balanced load currents which means poly-unit reactor 27 must draw balanced load currents. Upon the occurrence of an unbalance supply or load condition, the resulting unbalanced load voltage is indicated by voltmeter 73. By means of adjustment of taps 57 and 58 and tap 62, the phase angle and magnitude of the double-frequency A.C. control signal across primary winding 51 is adjusted. The A.C. control signal is coupled with the D.C. control system at secondary winding 53 and the combined signal is inserted into control winding 39. The adjustment of the phase angle and magnitude of the A.C. control signal is continued until the voltage across load 26, as indicated by voltmeter 73 and selector switch 74, is balanced.

If the supply voltage is unbalanced, the phase angle and magnitude of the double-frequency A.C. control signal is varied until poly-unit reactor 27 causes unbalance currents to flow in series reactors 19, 20 and 21 to balance the voltage across load 26. If load 27 is unbalanced and the supply voltage is balanced, the double-frequency A.C. control signal is varied in phase angle and magnitude until poly-unit reactor 26 absorbs the unbalance component of the load current so that only balanced currents flow in series reactors 19, 20 and 21. With balance restored, any third harmonic component in lines 22, 23 and 24 may be minimized by third harmonic filter 71.

It should be apparent that variations may be made in the arrangement without departing from the spirit of the invention except as defined in the appended claims.

What is claimed is:

1. In a regulator or the like, the combination including a source of polyphase A.C., a poly-unit polyphase reactor means having at least three saturable cores, with load winding means and control winding means on each core, said reactor means being connected to said source, and means for applying A.C. control power having double the frequency of said source to said control winding means, said A.C. control power producing a negative sequence component of current in the A.C. load winding means of said reactor.

2. In a regulator or the like, the combination including a source of polyphase A.C., a poly-unit polyphase reactor means having at least three saturable cores, with load winding means and control winding means on each core, said reactor means being connected to said source, means for applying A.C. control power to said control winding means, and means for applying A.C. control power having double the frequency of said source to said control winding means, said A.C. control power producing a negative sequence component of current in the A.C. load winding means of said reactor.

3. In a regulator or the like, the combination including a source of polyphase A.C., a poly-unit polyphase reactor means having at least three saturable cores, with load winding means and control winding means on each core, said reactor means being connected to said source, means for applying A.C. control power having double the frequency of said source to said control winding means, and means for adjusting the phase and magnitude of the A.C. control power, said A.C. control power producing a negative sequence component of current in the A.C. load winding means of said reactor.

4. In a regulator or the like, the combination including a source of polyphase A.C., a poly-unit polyphase reactor means having at least three saturable cores, with load winding means and control winding means on each core, said reactor means being connected to said source, means for applying D.C. control power to said control winding means, means for applying A.C. control power having double the frequency of said source to said control winding means, and means for adjusting the phase and magnitude of the A.C. control, said A.C. control power producing a negative sequence component of current in the A.C. load winding means of said reactor.

5. In a voltage regulator, the combination including an electrical load means, a source of A.C. connected to said load means, impedance means connected in series with said load means and source, a poly-unit saturable reactor means connected in shunt with said load means, each of the units of said reactor means having a load winding and a control winding, means for applying D.C. control power to said control windings, said D.C. control power being varied for variation in load voltage for all phases from a reference value so as to maintain said voltage substantially constant, and means for applying A.C. control power having double the frequency of said source of A.C. to said control windings, said A.C. control power being varied in magnitude and phase angle measured with respect to the phase of said source of A.C. for variations in load voltage of any phase with respect to the other phases to maintain said load voltage in said phases substantially balanced.

6. In a voltage regulator, the combination including an electrical load means, a source of A.C. connected to said load means, impedance means connected in series with said load means and source, a poly-unit saturable reactor means connected in shunt with said load means, each of the units of said reactor means having a load winding and a control winding, means for applying D.C. control power to said control windings, said D.C. control power being varied with variation in load voltage for all phases from a reference value so as to maintain said voltage substantially constant, a source of A.C. control power having double the frequency of said A.C. source being connected to said control windings, and means for varying the magnitude and phase of said A.C. control power, said A.C. control power being varied in magnitude and phase with variations in load voltage of any phase with respect to the other phases to maintain said load voltage in said phases substantially balanced.

7. In a voltage regulator, the combination including an electrical load means, a source of A.C. connected to said load means, impedance means connected in series with said load means and A.C. source, a poly-unit saturable reactor means connected in shunt with said load means, each of the units of said reactor means having a load winding and a control winding, means for supplying D.C. control power for said control windings, said D.C. control power being varied for variation in load voltage for all phases from a reference value so as to maintain said voltage substantially constant, and means for supplying A.C. control power having double the frequency of said source of A.C., the magnitude and phase angle of said A.C. control power being varied for variations in load voltage of any phase with respect to the other phases to maintain said load voltage in said phases substantially balanced, and means for coupling said D.C. control power and said A.C. control power into said control windings.

8. In a voltage regulator, the combination including an electrical load means, a source of A.C. connected to said load means, impedance means connected in series with said load means and A.C. source, a poly-unit saturable reactor means connected in shunt with said load means, each of the units of said reactor means having a load winding and a control winding, means for supplying D.C. control power for said control windings, said D.C. control power being varied for variation in load voltage for all phases from a reference value so as to maintain said voltage substantially constant, means for supplying A.C. control power having double the frequency of said source of A.C. for said control windings, said A.C. control power being varied in magnitude and phase angle for variations in load voltage of any phase with respect to the other phases to maintain said load voltage in said phases substantially balanced, means for coupling said D.C. control power and said A.C. control power into said control windings, and means for blocking said A.C. control power from said means for supplying D.C. control power.

9. In a voltage regulator, the combination including an electrical load means, a source of A.C. connected to said load means, impedance means connected in series with said load means and A.C. source, a poly-unit saturable reactor means connected in shunt with said load means, each of the units of said reactor means having a load winding and a control winding, means for applying D.C. control power to said control windings, said D.C. control power being varied for variation in load voltage for all phases from a reference value so as to maintain said voltage substantially constant, means for applying A.C. control power having double the frequency of said A.C. source to said control windings, said A.C. control power being varied in magnitude and phase angle for variations in load voltage of any phase with respect to the other phases to maintain said load voltage in said phases substantially balanced, and means in shunt with said load means for absorbing the harmonic components of said load currents.

10. In a voltage regulator, the combination including an electrical load means, a source of A.C. connected to said load means, impedance means connected in series with said load means and A.C. source, a poly-unit saturable reactor means connected in shunt with said load means, each of the units of said reactor means having a load winding and a control winding, means for applying D.C. control power to said control windings, said D.C. control power being varied for variation in load voltage for all phases from a reference value so as to maintain said voltage substantially constant, means for applying A.C. control power having double the frequency of said source of A.C. to said control windings, said A.C. control power being varied in magnitude and phase angle for variations in load voltage of any phase with respect to the other phases to maintain said load voltage in said phases substantially balanced, and capacitive reactance means in series with said poly-unit saturable reactor means to improve transient behavior.

11. In a voltage regulator, the combination including an electrical load means, a source of A.C. connected to said load means, a reactor means connected to series with said load means and A.C. source, a poly-unit saturable reactor means connected in shunt with said load means, each of the units of said reactor means having a load winding and a control winding, means for applying D.C. control power to said control windings, said D.C. control power being varied for variation in load voltage for all phases from a reference value so as to maintain said voltage substantially constant, and means for applying A.C. control power having double the frequency of said source of A.C. to said control windings, said A.C. control power being varied in magnitude and phase angle measured with respect to the phase of said source of A.C. for variations in load voltage of any phase with respect to the other phases to maintain said load voltage in said phases substantially balanced.

12. In a voltage regulator, the combination including an electrical load means, a source of A.C. connected to said load means, a reactor means connected in series with said load means and source, a poly-unit saturable reactor means connected in shunt with said load means and comprising at least three multi-winding saturable reactors, each having its load turns and core area related to those of the others so that twice during each cycle of A.C. from said A.C. source, the reactor units will desaturate in a predetermined manner so as to provide a desired wave form, each of the units of said reactor means having a control winding, means for applying D.C. control power to said control windings, said D.C. control power being varied for variation in load voltage for all phases from a reference value so as to maintain said voltage substantially constant, and means for applying A.C. control power having double the frequency of said source of A.C. to said control windings, said A.C. control power being varied in magnitude and phase angle with respect to the phase of said source of A.C. with variations in load voltage of any phase with respect to the other phases to maintain said load voltage in said phases substantially balanced.

References Cited in the file of this patent

UNITED STATES PATENTS 2,572,648    Mittag ---------------- Oct. 23, 1951